United States Patent [19]
Schousek

[11] Patent Number: 5,474,327
[45] Date of Patent: Dec. 12, 1995

[54] VEHICLE OCCUPANT RESTRAINT WITH SEAT PRESSURE SENSOR

[75] Inventor: Theresa J. Schousek, Kokomo, Ind.

[73] Assignee: Delco Electronics Corporation, Kokomo, Ind.

[21] Appl. No.: 325,718

[22] Filed: Jan. 10, 1995

[51] Int. Cl.⁶ .................................................. B60R 21/32
[52] U.S. Cl. ..................... 280/735; 180/268; 280/730.1
[58] Field of Search .................................. 280/730.1, 732, 280/735; 180/268

[56] References Cited

U.S. PATENT DOCUMENTS

| | | | |
|---|---|---|---|
| 5,074,583 | 12/1991 | Fujita et al. | 280/735 |
| 5,161,820 | 11/1992 | Vollmer | 280/730.1 |
| 5,172,790 | 12/1992 | Ishikawa et al. | 180/268 |
| 5,232,243 | 8/1993 | Blackburn et al. | 280/732 |

OTHER PUBLICATIONS

Alps Product Brochure (publication date unknown).
Interlink Product Brochure (publication date unknown).

*Primary Examiner*—Kenneth R. Rice
*Attorney, Agent, or Firm*—Mark A. Navarre

[57] ABSTRACT

An air bag restraint system is equipped with seat occupant sensing apparatus for a passenger seat which detects both infant seats and adults and distinguishes between rear and forward facing infant seats. Air bag deployment is inhibited when an occupied rear facing infant seat is present. The sensing apparatus comprises eight variable resistance pressure sensor in the seat cushion. The response of each sensor to occupant pressure is monitored by a microprocessor which calculated total weight and weight distribution. The weight is used to discriminate between an occupied infant seat, an adult and no occupant. The weight distribution is used to distinguish between forward and rear facing infant seats. Another embodiment uses the occupant sensing along with seat belt fastening detection to indicate when a seat is occupied and the belt is not fastened.

11 Claims, 4 Drawing Sheets

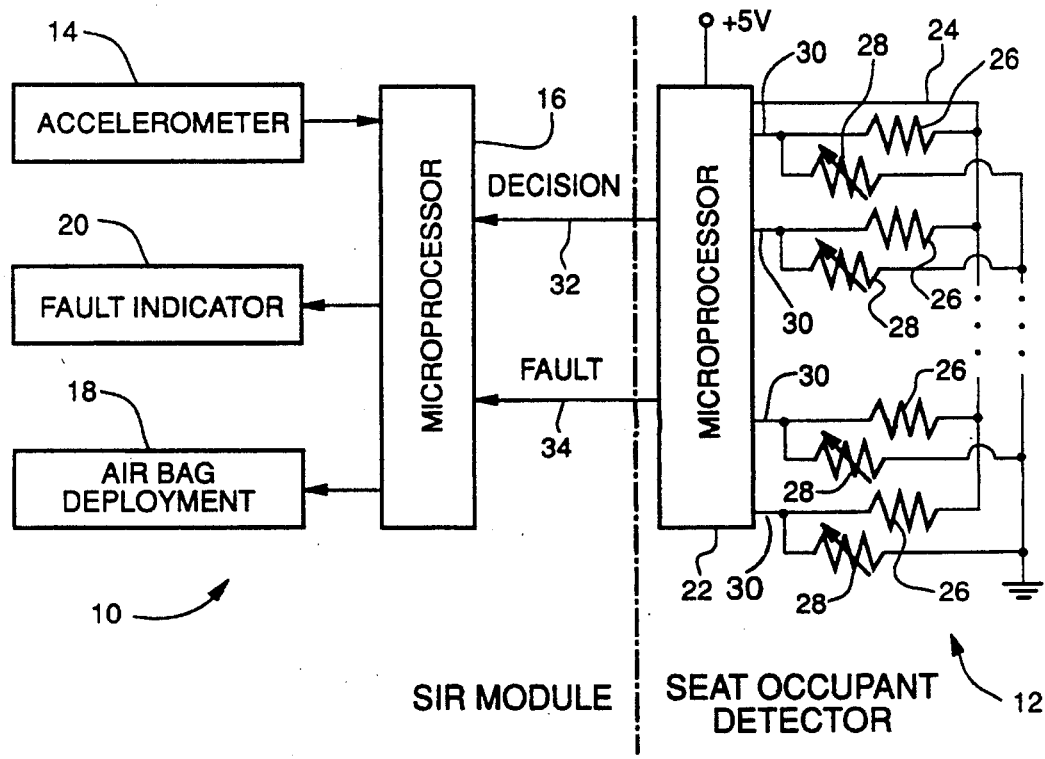
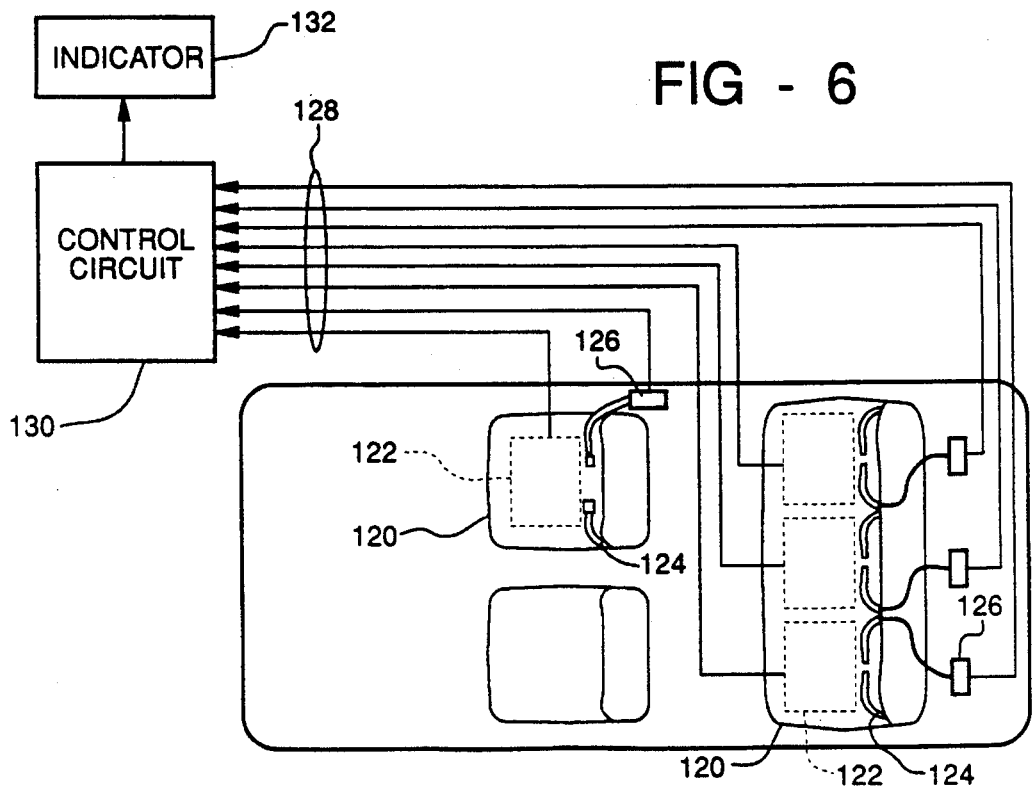
FIG - 6

5,474,327

VEHICLE OCCUPANT RESTRAINT WITH SEAT PRESSURE SENSOR

FIELD OF THE INVENTION

This invention relates to occupant restraints for vehicles and particularly to a restraint system having seat sensors to identify adult and infant seat occupancy.

BACKGROUND OF THE INVENTION

The expanding use of supplemental inflatable restraints (SIRs) or air bags for occupant protection in vehicles increasingly involves equipment for the front outboard passenger seat. The driver side air bag has been deployed whenever an imminent crash is sensed. The position and size of the driver is fairly predictable so that such deployment can advantageously interact with the driver upon a crash. The passenger seat, however, may be occupied by a large or a small occupant including a baby in an infant seat. It can not be assumed that a passenger of any size is at an optimum position (leaning against or near the seat back). An infant seat is normally used in a rear facing position for small babies and in a forward facing position for larger babies and small children. While the forward facing position approximates the preferred position for air bag interaction, the rear facing position places the top portion of the infant seat close to the vehicle panel which houses the passenger side air bag. In the latter event, it may be desirable to prevent deployment of the air bag. Similarly, if a passenger in the seat is leaning forward, it may be desirable to prevent air bag deployment.

It has been proposed to use a magnet or other special attachment on an infant seat and a special sensor in the seat or panelboard which detects the attachment and allows determination that an infant seat is present and is positioned in a particular way. Of course that arrangement is operable only with the specially equipped infant seats; other infant seats and passengers are not serviced. A separate sensing system would have to be employed to detect the position or presence of small children or adults.

Seat belt restraint systems can also benefit by information about the presence of passengers. For example, by monitoring which belts are buckled and which seats are occupied, a warning display can inform the driver that some seat or a particular seat is occupied and the belt is not utilized. Where an infant seat is in a vehicle seat and the infant seat is occupied, this seat also should be belted in and the warning system employed to detect a failure to meet this condition.

SUMMARY OF THE INVENTION

It is therefore an object of the invention to detect a full range of vehicle passengers including occupied infant seats supported on a vehicle seat. Another object is to detect such passengers and to discriminate between rear facing and front facing infant seats. Another object is to control a restraint system in accordance with information developed by detecting the presence of occupants and the positions of occupants.

A SIR system, as is well known, has an acceleration sensor to detect an impending crash, a micro-controller to process the sensor signal and to decide whether to deploy an air bag, and a deployment unit fired by the micro-controller. An occupant detection system can determine if an occupant or infant seat is positioned in a way to not benefit from deployment, and then signalling the micro-controller whether to allow deploying the air bag.

A large array of many hundreds of pressure sensors in or on a vehicle seat cushion can reveal a pressure profile which is distinctive for each type of seat occupant and can also measure the weight of the occupant. An adult has one kind of profile, a front facing infant seat has another, and a rear facing infant seat has still another. These profiles indicate that the "center of gravity" or center of weight distribution is distinctive for each of these three conditions. Such an array of sensors, however, is very expensive and the electronic equipment for servicing the array and analyzing the pressure information is also expensive.

It has been found, however, that a very small number of sensors, judicially located in the seat, can garner sufficient pressure and distribution information to allow determination of the occupant type and infant seat position. This information, in turn, can be used as desired to inhibit SIR deployment. Two sets of four sensors symmetrically arranged on either side of a seat centerline are adequate to gather the pressure data. In each set, two sensors are situated near the centerline and near the back of the seat cushion, the other two are further forward and outboard, one on the wing of the cushion and the other just inboard of the wing. Each sensor is a very thin resistive device, having lower resistance as pressure increases. A microprocessor is programmed to sample each sensor, determine a total weight parameter by summing the pressures registered by the several sensors, and determine the center of weight distribution from the sum of the products of each sensed pressure and its distance from the rear of the seat, and dividing the product by the total weight.

Based on the minimum weight of an occupied infant seat (about 10 pounds) and the maximum weight of an occupied infant seat (50 pounds), maximum and minimum thresholds are calibrated, and those are compared to the measured total weight parameter to determine whether the vehicle seat is holding an occupied infant seat, a larger person, or has no occupant. The center of weight distribution is used to determine the position of an infant seat, a rear facing seat having a weight center much further forward than a forward facing seat. Given the occupant information, it can then be decided whether to deploy the air bag during a crash. The decision depends on the desired results which may be dictated by the legal requirements where the vehicle is operated. Typically, the air bag deployment will be prevented at least in the case of an occupied rear facing infant seat.

A sampling of the sensors and a deployment decision is made periodically, say each second, and the system is monitored for failure by testing consistency of the decisions. If five consecutive decisions are the same, that decision is validated and signalled to the SIR microcontroller; if the five decisions are not the same, a failure is registered and the previous validated decision is maintained. In any event, a signal to enable or disable deployment is issued every five seconds. However the failures are counted and if a large number of failures occur, a failure signal is sent to the micro-controller.

Another use of the seat pressure profile sensor in a restraint system is for a seat belt warning indicator to advise the vehicle operator whether any seat is occupied either by a baby in an infant seat or by a larger person, and the seat belt for that seat is not fastened.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic diagram of a SIR system and an associated seat sensor system according to the invention;

FIG. 6 is a schematic diagram of a seat pressure sensor and seat belt system according to another embodiment of the invention.

DESCRIPTION OF THE INVENTION

Figure 2:
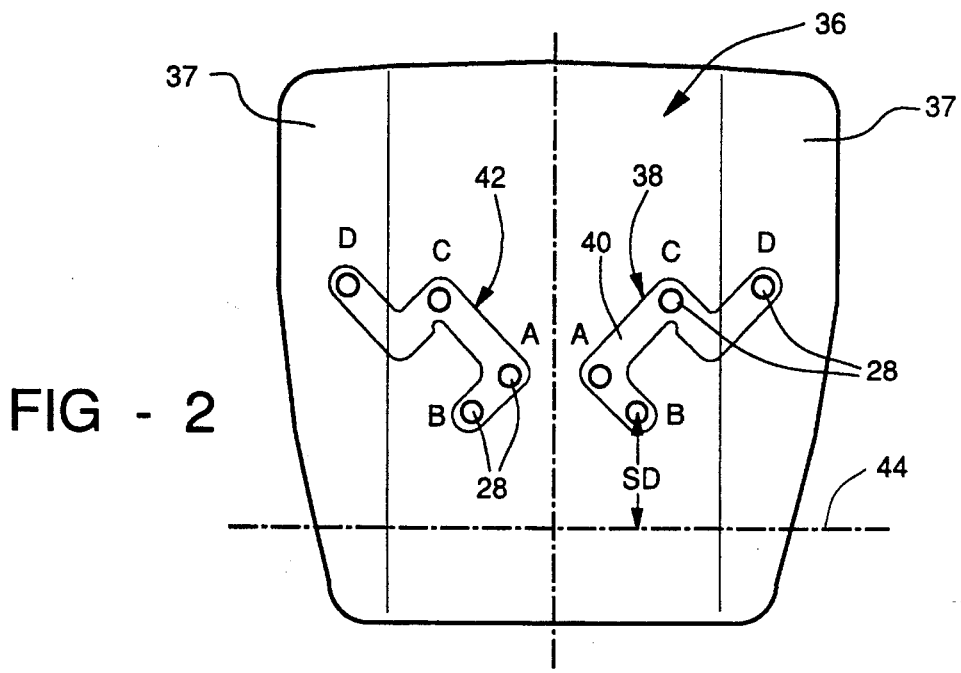
FIG. 2 is a top view of a vehicle seat cushion having pressure sensors positioned on the seat, according to the invention.

Referring to FIG. 1, a SIR system includes a SIR module 10 coupled to a seat occupant sensing system 12. The SIR module 10 includes an accelerometer 14 mounted on the vehicle body for sensing an impending crash, a microprocessor 16 for receiving a signal from the accelerometer and for deciding whether to deploy an air bag. An air bag deployment unit 18 is controlled by the microprocessor 16 and fires a pyrotechnic or compressed gas device to inflate an air bag when a deploy command is received. A fault indicator 20, also controlled by the microprocessor 16 will show a failure of the seat occupant sensing system 12.

The seat occupant sensing system 12 comprises a microprocessor 22 having a 5 volt supply and an enabling line 24 periodically provided with a 5 volt enabling pulse, and a series of voltage dividers coupled between the enabling line 24 and ground. Each voltage divider has a fixed resistor 26 in series with a pressure sensor or variable resistor 28, and the junction point of each resistor 26 and variable resistor 28 is connected to an A/D port 30 of the microprocessor 22. The microprocessor 22 controls the pulse on enabling line 24 and reads each sensor 28 voltage during the pulse period. The microprocessor 22 analyzes the sensor inputs and issues a decision whether to inhibit air bag deployment and the decision is coupled to the microprocessor 16 by a line 32. The microprocessor 22 also monitors its decisions for consistency and issues a fault signal on line 34 to the microprocessor 16 if faults continue to occur over a long period.

Each fixed resistor 26 is, for example, 17.4 kohms and the variable resistors vary between 2 kohms at high pressure and 174 kohms at low pressure. Then the voltage applied to the ports 30 will vary with pressure from about 4.6 volts to 0.5 volts. Each sensor is mounted between polymer film sheets and includes a pair of conductive electrodes about one inch in diameter separated by carbon layers such that the resistance between electrodes decreases as pressure increases. Such sensors are available as UniForce (TM) sensors from Force Imaging Technologies, Inc., Chicago, Ill. To minimize any deteriorating effects of current through the sensors, short enabling pulses of 1 ms are applied once each second.

The mounting arrangement of sensors 28 on a bottom bucket seat cushion 36 with lateral wings 37 is shown in FIG. 2. A first set 38 of four sensors 28 mounted on a common flexible circuit substrate 40 is located on the right side of a seat center line and a second set 42 is symmetrically disposed on the left side of the center line. In each set, a sensor at position A is close to the centerline and near the back of the cushion, a sensor at position B is outboard of position A and further back. A third sensor 28 at position C is forward of position A and near the wing 37, and a fourth sensor at position D is on the wing 37 and forward of position C. Although weight distribution of an occupant may be assumed to be approximately balanced between left and right sides of the seat, having sensors on both sides of the seat allows good data collection and measurement of total weight and distribution in the event of unbalance. Weight distribution is centered somewhere within the confines of the sensor grouping and is calculated with reference to an arbitrary datum line 44 extending transversely of the seat. The particular center of weight distribution is determined by calculating the product of each measured sensor response and the sensor distance SD from the datum line 44, summing the products, and dividing the sum by the total of all the measured weights. In practice, it is found that the center of weight varies greatly depending on the type of occupant and whether an infant seat faces forward or rearward.

Figure 3:
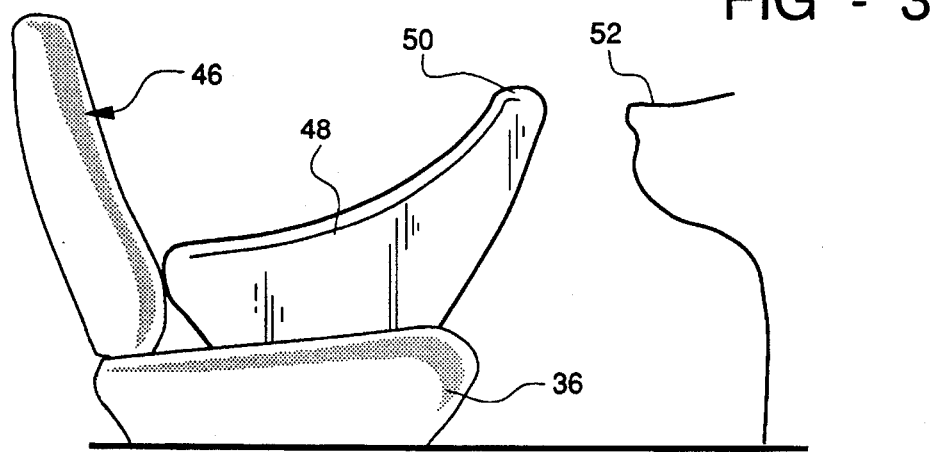
FIG. 3 is an outline elevational view of a vehicle seat containing a rear facing infant seat illustrating an application of the invention.
Figure 4:
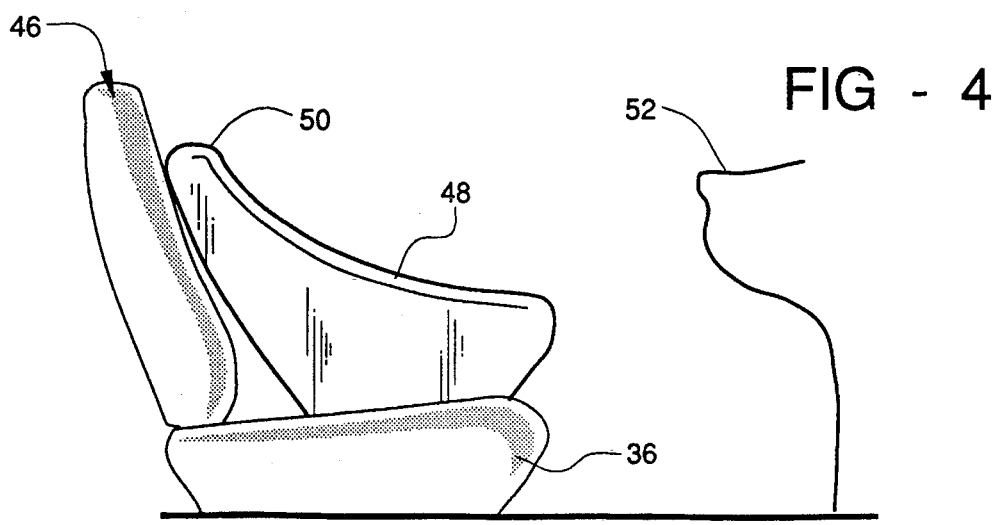
FIG. 4 is an outline elevational view of a vehicle seat containing a forward facing infant seat illustrating an application of the invention.

In FIG. 3, a vehicle seat 46 having a bottom cushion 36 instrumented according to the arrangement of FIG. 2, supports an infant seat 48 facing to the rear, which is the preferred position for small babies. Seat belts for securing the infant seat are not shown. The top or head portion 50 of the infant seat 48 extends toward the front of the passenger compartment and is spaced from the vehicle instrument panel 52. FIG. 4 shows the same infant seat 48 facing forward and the head portion leans against the seat back. It is apparent by comparison of the FIGS. 3 and 4 that the center of gravity of the rear facing infant seat is much further forward than the forward facing seat, and experimental data supports that conclusion. Adult occupants, when seated normally, have a center of gravity near the rear of the seat.

The seat pressure sensor locations are selected to detect the difference of center of gravity of the rear and forward facing infant seats. In FIG. 2 the positions A and B mainly reflect the adult occupant presence and the positions C and D mainly reflect the infant seat presence. While the sensors are localized and do not actually weigh the whole person or infant seat, they can measure weight parameters which together represent the total weight and can be empirically related to the total weight, and in the same way the center of weight distribution calculations can approximate the real center of gravity positions well enough to clearly distinguish between forward and rear facing infant seats.

The sensors are preferably located just beneath the seat cover and some pressure is exerted on the sensors by the seat cover. At the time of vehicle manufacture, the sensors are calibrated by measuring each sensor voltage for an empty seat condition and those calibration voltages are stored. When weight measurements are made by a particular sensor, the current voltage is read and subtracted from the calibration voltage. The difference voltage then is a function of the pressure exerted on the sensor and is empirically related to actual occupant weight. That is, the sum of measured voltage differences is a weight parameter which represents occupant weight and the value of that sum is empirically determined for critical threshold values which are used in determining the occupant type. These values are, for example, 50 pounds for the maximum weight of an occupied infant seat, and 10 pounds for the minimum weight of an occupied infant seat, allowing a range of 5 to 10 pounds for seat weight and a range of 5 to 40 pounds for baby weight. Thus by selecting voltage values for these two thresholds a distinction can be made among empty seat, occupied infant seat and a larger seated occupant. The maximum and minimum threshold values are stored in the microprocessor 22.

The calculated weight center or weight distribution parameter made by summing the products of the sensor outputs and their distance from a datum line, and dividing the sum by the total weight parameter yields a first set of results for a rear facing infant seat and a second set for a front facing infant seat. These two sets are on opposite sides of an imaginary transverse reference line; the results for rear facing seats are in front of the line and the results for forward facing seats are behind the reference line. The distance data for each sensor is stored in the microprocessor 22 which makes the calculation, and the position of the imaginary reference line is also stored there for comparison with the calculated weight distribution parameter.

Figure 5A:
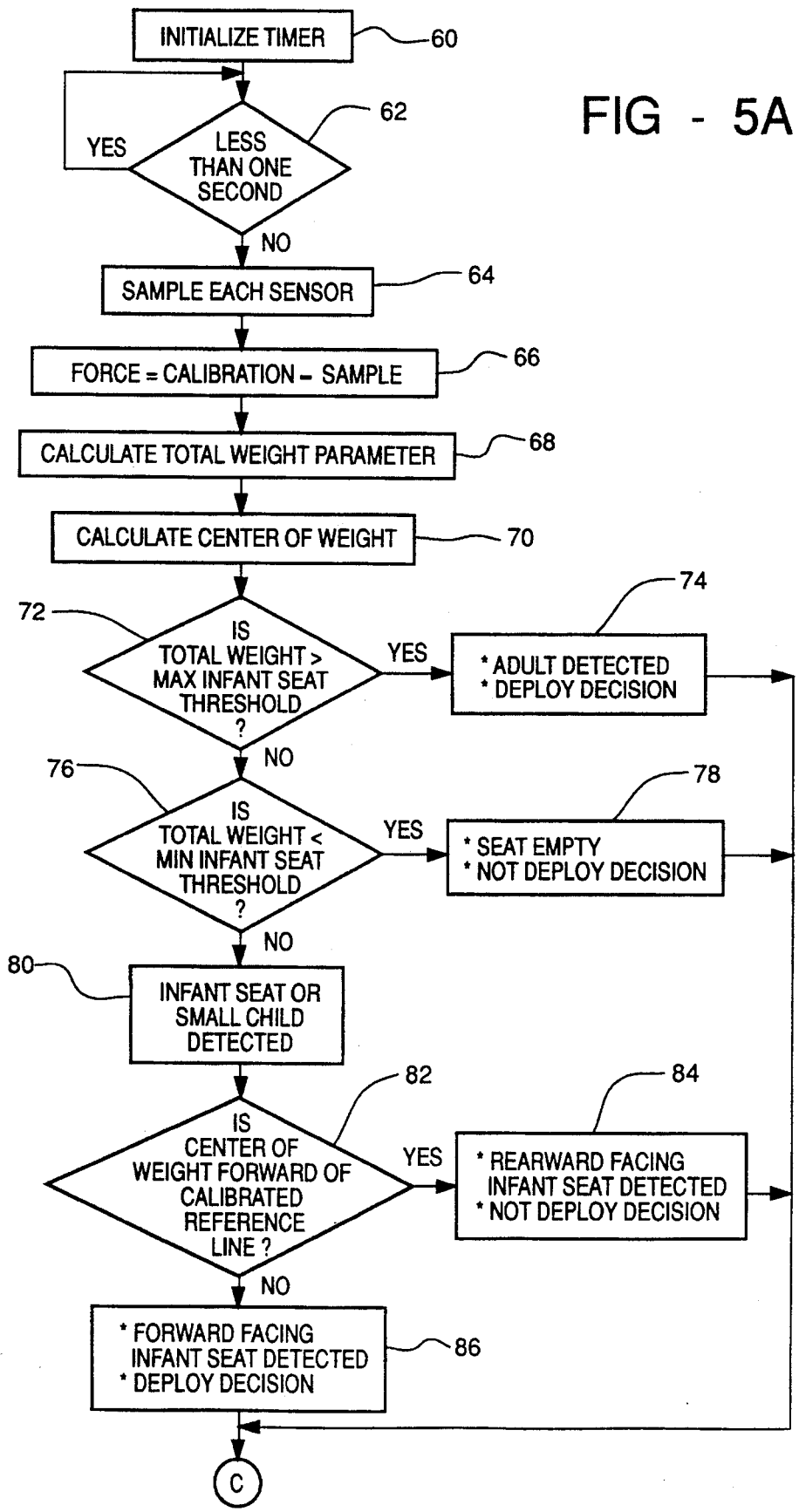
FIGS. 5a, 5b and, in combination, comprise a flow chart representing a computer program for seat occupant detection and SIR control according to the invention.

The microprocessor 22 is programmed to issue enabling pulses on line 24, read each sensor during each pulse, make a decision whether to allow deployment, monitor the decisions for a fault, and output the decision and fault results to the SIR microprocessor 16. The flow chart of FIGS. 5a, 5b and represents the program. Reference numerals shown herein in angle brackets <nn> refer to functions described in flow chart boxes bearing those numerals. At the beginning of the program a timer is initialized <60> and the program is delayed <62> until one second has elapsed in order to limit the program execution to once per second. Then the sensors are enabled and each sensor sampled <64>. The sampled voltage is subtracted from the sensor calibration voltage to determine a force for each sensor <66> and they are summed to obtain a total force or weight parameter <68>. Then a center of force or weight distribution is made <70>. If the total weight parameter is greater than the maximum infant seat weight <72> this indicates that a larger occupant is present and a decision is made to allow deployment <74>. Otherwise, if the total weight parameter is less than the minimum weight threshold for an occupied infant seat <76> it is determined that the seat is empty and a decision is made to inhibit deployment <78>. The same result could be obtained if a child or larger occupant in the seat is out of position, i.e., leaning forward; then it still is desirable to inhibit deployment. If the total weight parameter is between the threshold the occupant is identified as an occupied infant seat or a small child <80>. If the center of weight distribution is forward of the reference line <82> a rear facing infant seat is detected and a decision to inhibit deployment is made <84>. If the center of weight distribution is not forward of the reference line, a forward facing infant seat is detected and a decision is made to allow deployment of the air bag <86>.

Figure 5B:
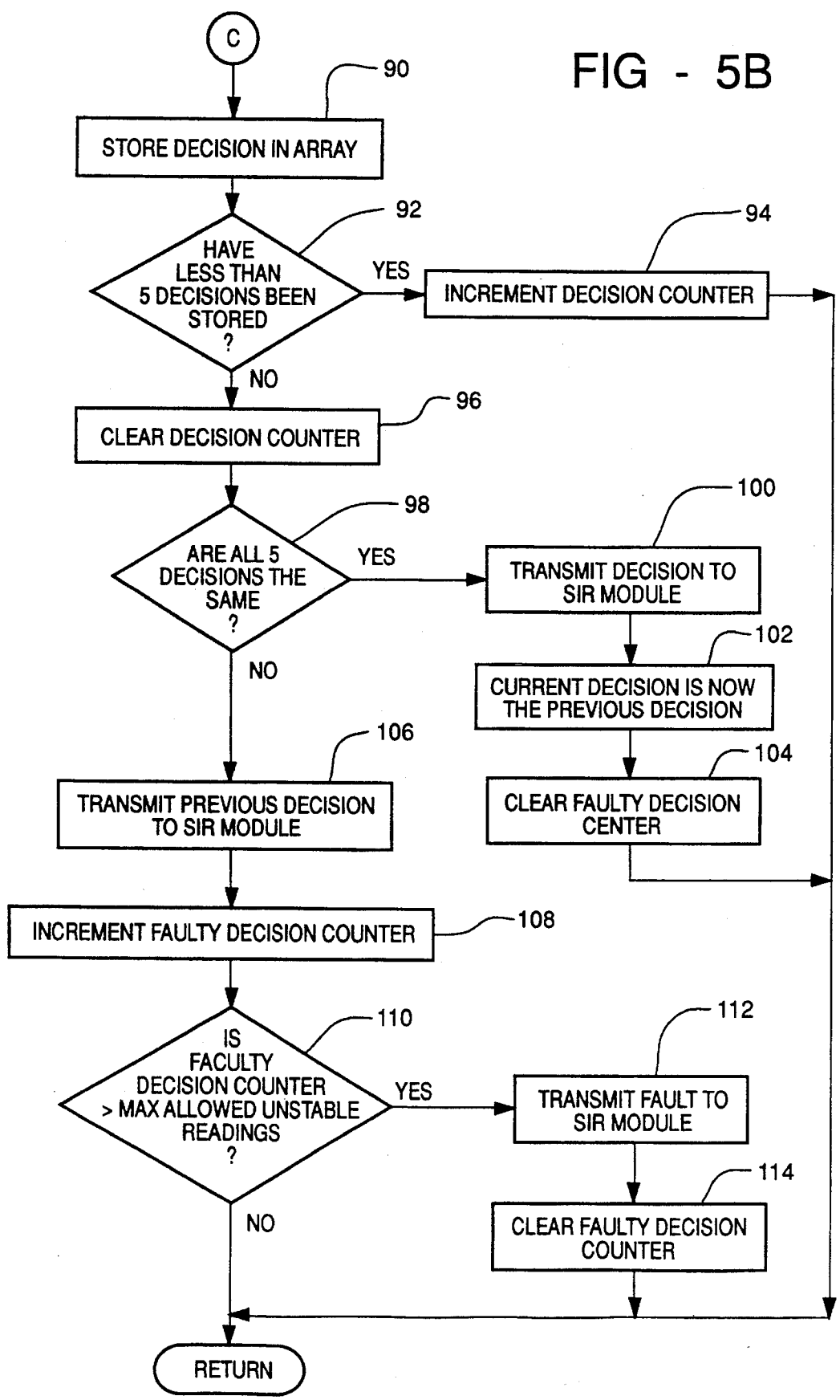

The portion of the flow chart shown in FIG. 5b is directed to detecting a fault by monitoring the consistency of the decisions. The decision made in each loop execution is stored in an array <90> and if less than five decisions have been stored <92> a decision counter is incremented <94>. If the counter reaches a count of five, the counter is cleared <96> and the decisions are compared to determine if they are all the same <98>. If they are the same, the current decision is transmitted to the SIR module 10 <100>, the current decision is labelled as the previous decision <102>, and a faulty decision counter is cleared <104>. If all five decisions are not the same, the previous decision is retransmitted to the module 10 <106> and the faulty decision counter is incremented <108>. If a large number of consecutive faulty decisions occur <110> a fault signal is transmitted to the SIR module 10 <112> and the faulty decision counter is cleared <114>. The maximum allowed number of unstable readings may, for example, amount to one half hour of operation. With this program the decision to allow deployment is updated every five seconds, and an occasional spurious decision, which may be due to occupant movement or other instability, is filtered out. Extended instability triggers the fault signal which results in energizing the fault indicator 20.

It is thus seen that a relatively simple seat pressure sensor along with a logical decision program can provide a substantial amount of information about the nature of a passenger seat occupant, if any, and a reliable decision whether to inhibit air bag deployment. It is expected that this system be limited to a passenger seat subject to SIR protection.

Referring to FIG. 6, a seat belt monitoring system provides belt usage information to the driver for each passenger seat so that the driver can enforce a requirement that each passenger's seat belt be fastened. Thus it is desirable to determine whether a seat is occupied and to generate a warning signal only if an occupied seat has an unfastened belt. Each passenger seat position for front and rear seats 120 is equipped with a seat sensor 122 of the type shown in FIG. 2. Seat belts 124 for each position each have a seat belt detector 126 which signals that a belt is not fastened. Signal lines 128 from the sensors 122 and detectors 126 connect with a control circuit 130 which can determine whether a seat is occupied and the corresponding belt is unfastened, and if so to activate an indicator 132 which informs the driver of non-compliance. In the case of infant seats only the weight measurement is needed to determine whether a seat is occupied, the position of the infant seat being irrelevant. The control circuit 130 then should contain a microprocessor programmed with steps 60 through 80 of FIG. 5a to determine if a seat is empty or occupied, the program being separately executed for each seat sensor 122, and additional logic to determined whether an occupied seat correlates with an unfastened belt.

The embodiments of the invention in which an exclusive property or privilege is claimed are defined as follows:

1. In a vehicle occupant restraint system sensitive to the occupancy of a vehicle seat by an adult and an occupied infant seat and to the position of an infant seat including pressure sensors strategically located in the vehicle seat for response to the adult occupants and of infant seats, the method of controlling air bag deployment comprising the steps of:

measuring a pressure response of each sensor;

calculating a total occupant weight;

calculating a weight distribution parameter;

distinguishing between adult and occupied infant seat presence on the basis of total occupant weight;

distinguishing between forward facing and rear facing infant seats on the basis of the weight distribution parameter; and determining whether to inhibit deployment on the basis of adult presence, and on presence and position of an infant seat.

2. The invention as defined in claim 1, wherein the weight distribution parameter represents a fore and aft position on the vehicle seat, and wherein the step of distinguishing between forward facing and rear facing infant seats on the basis of the weight distribution parameter includes:

establishing a reference line relative to the sensors which divides a forward weight distribution indicative of a rear facing infant seat from a rear weight distribution indicative of a front facing infant seat; and determining the infant seat position from the weight distribution parameter and the reference line.

3. The invention as defined in claim 1 wherein the step of calculating a weight distribution parameter comprises:

establishing a datum line extending transverse of the seat;

multiplying the pressure response of each sensor by the distance of the sensor from the datum line to obtain a product; and dividing the sum of the products by the total weight.

4. The invention as defined in claim 1 wherein the step of determining whether to inhibit deployment includes a decision to allow deployment in the case of adult presence or a forward facing infant seat, and to inhibit deployment in the case of a rear facing infant seat.

5. In a vehicle occupant restraint system sensitive to the occupancy of a vehicle seat by an adult and an occupied infant seat including pressure sensors strategically located in the vehicle seat for response to adult occupants and to infant seats, the method of detecting infant and adult presence comprising the steps of:

establishing a maximum response threshold and a minimum response threshold for occupied infant seats;

measuring a pressure response of each sensor;

calculating an occupant weight parameter from measured pressure responses;

distinguishing between adult presence and an occupied infant seat on the basis of the occupant weight parameter and the maximum response threshold; and distinguishing between an occupied infant seat and no occupant on the basis of the occupant weight parameter and the minimum response threshold.

6. The invention as defined in claim 5 wherein the occupant restraint system is an SIR system and the method includes inhibiting air bag deployment including the steps of:

determining from the pressure responses of the sensors whether an infant seat is rear facing or forward facing; and inhibiting deployment when an occupied rear facing infant seat is detected.

7. The invention as defined in claim 6 wherein the step of determining from the pressure responses of the sensors whether an infant seat is rear facing or forward facing comprises the steps of:

calculating a weight distribution parameter from the pressure response of each sensor and the position of each sensor; and discriminating between front and rear facing infant seats on the basis of the weight distribution parameter.

8. The invention as defined in claim 5 wherein the occupant restraint system is a seat belt system having detectors for seat belt engagement, and the method includes indication of seat belt usage comprising the steps of:

determining whether a seat is occupied;

detecting that a seat belt is not fastened; and indicating when a seat is determined to be occupied and its corresponding seat belt is not fastened.

9. A vehicle occupant restraint system sensitive to the occupancy of a vehicle seat by an adult and an occupied infant seat including:

an array of pressure sensors located on a vehicle seat to respond to the weight of an adult occupant and of an occupied infant seat;

means for sampling each sensor to determine a plurality of weight parameters; and means for comparing aggregate weight parameters to first and second thresholds to determine adult presence, occupied infant seat presence, and no occupant.

10. The invention as defined in claim 9 further including:

control means for deploying an air bag;

means for determining weight distribution from the weight parameters; and means for withholding air bag deployment when the weight distribution is centered toward the front of the sensor array and for allowing air bag deployment when the weight distribution is toward the rear of the sensor array.

11. The invention as defined in claim 9 wherein the weight distribution of a rear facing infant seat is forward of the weight distribution of a front facing infant seat, the system including:

control means for deploying an air bag;

means for determining weight distribution from the weight parameters;

means for determining from the weight distribution whether an rear facing infant seat is present; and means for withholding air bag deployment when a rear facing infant seat is present.

* * * * *